March 29, 1960  E. A. SCHONROCK  2,930,653
AUXILIARY CAM LIFTING ASSEMBLY FOR CABLE DUMP TRAILERS
Filed June 1, 1954  5 Sheets-Sheet 1
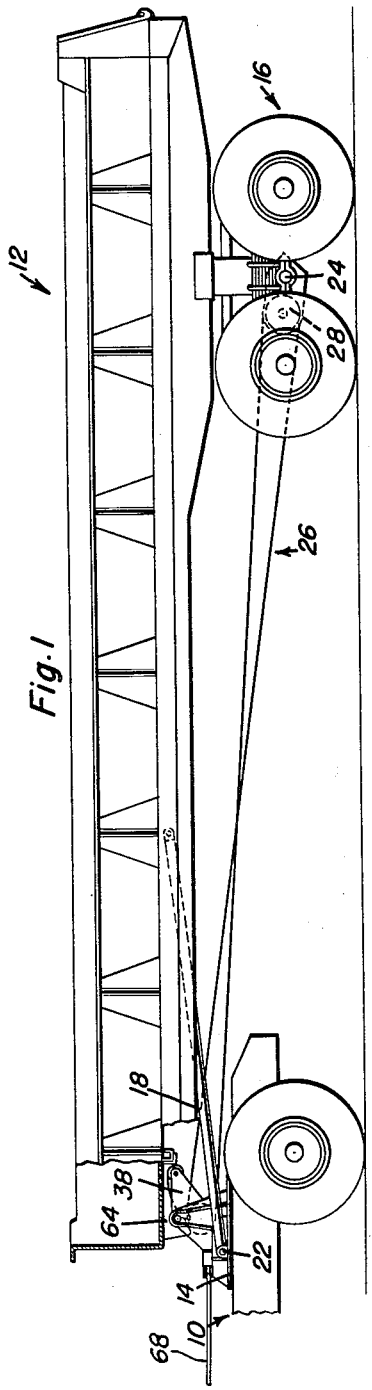
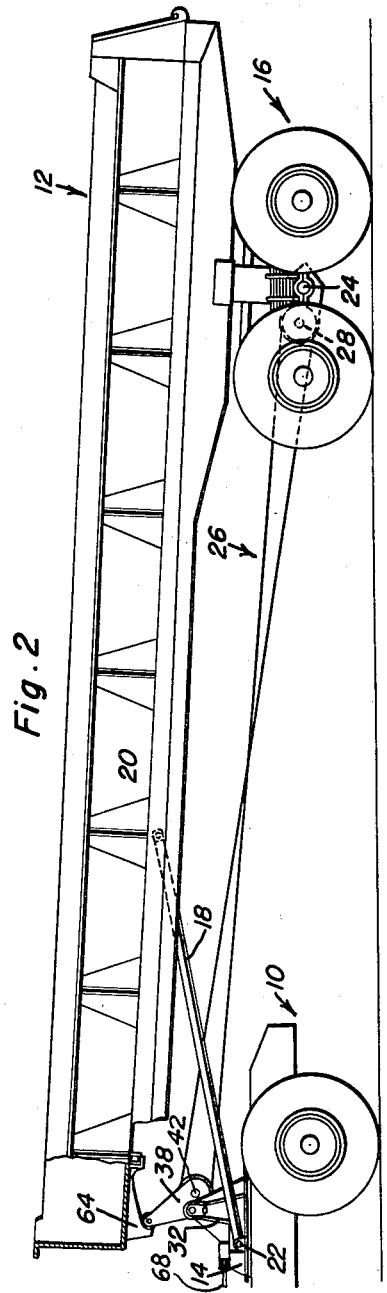
*Edwin A. Schonrock*
INVENTOR.
BY March 29, 1960  E. A. SCHONROCK  2,930,653
AUXILIARY CAM LIFTING ASSEMBLY FOR CABLE DUMP TRAILERS
Filed June 1, 1954  5 Sheets-Sheet 2

Edwin A. Schonrock
INVENTOR.

March 29, 1960 E. A. SCHONROCK 2,930,653
AUXILIARY CAM LIFTING ASSEMBLY FOR CABLE DUMP TRAILERS
Filed June 1, 1954 5 Sheets-Sheet 3
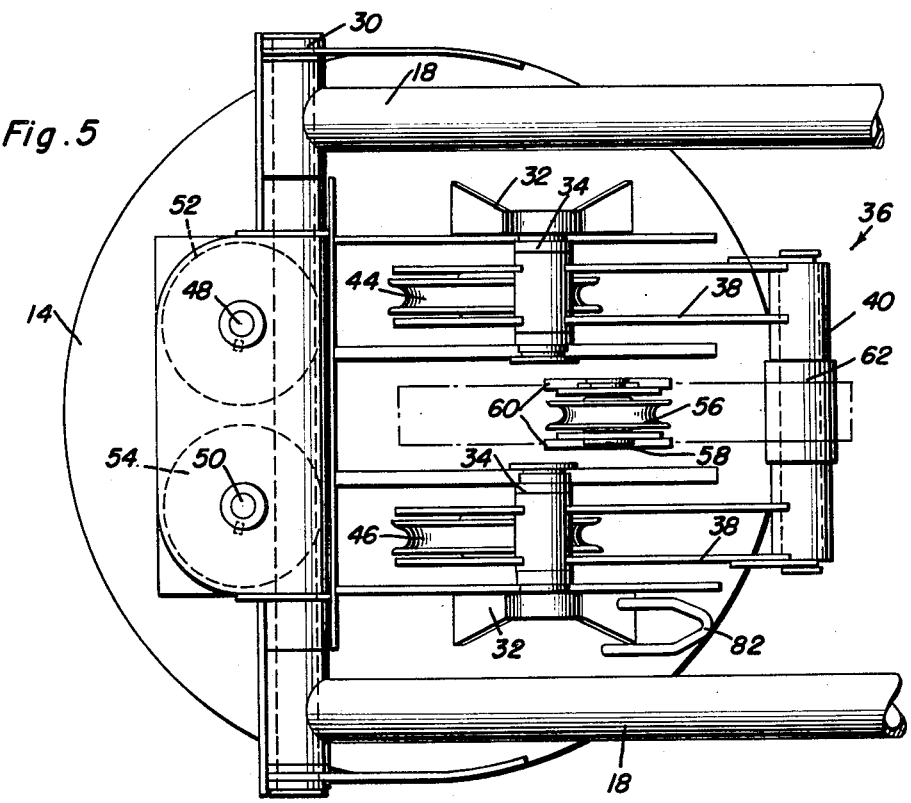
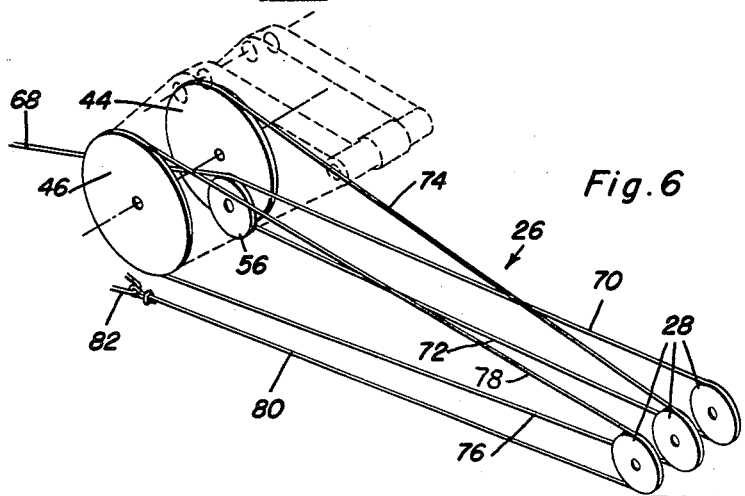
Edwin A. Schonrock
INVENTOR.

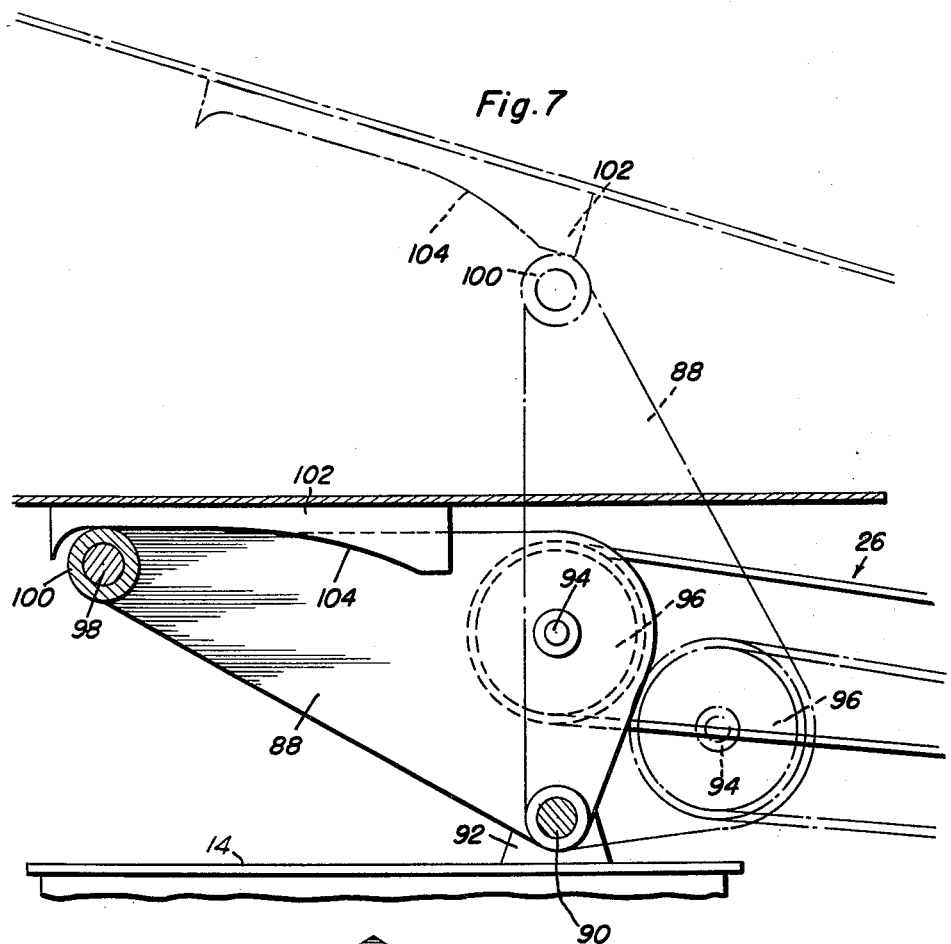
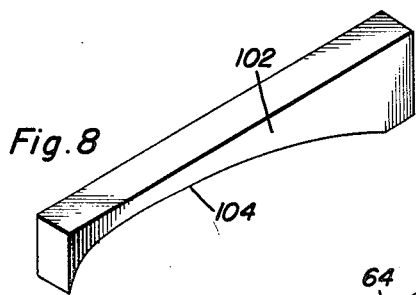
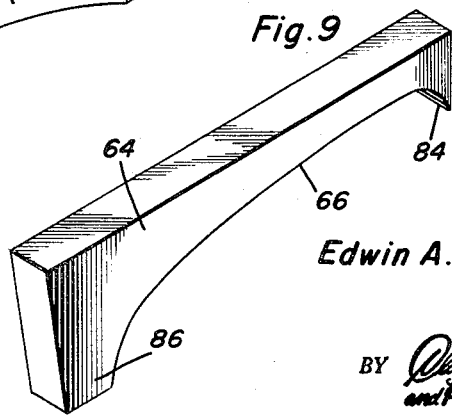
Edwin A. Schonrock
INVENTOR.

March 29, 1960 E. A. SCHONROCK 2,930,653
AUXILIARY CAM LIFTING ASSEMBLY FOR CABLE DUMP TRAILERS
Filed June 1, 1954 5 Sheets-Sheet 5

Edwin A. Schonrock
INVENTOR.

United States Patent Office 2,930,653
Patented Mar. 29, 1960

2,930,653

AUXILIARY CAM LIFTING ASSEMBLY FOR CABLE DUMP TRAILERS

Edwin A. Schonrock, San Angelo, Tex., assignor to Fruehauf Trailer Company, Detroit, Mich., a corporation of Michigan Application June 1, 1954, Serial No. 433,665

25 Claims. (Cl. 298—20)

This invention comprises novel and useful improvements in an upper fifth wheel with rotatably mounted sheave and cam lift assembly for dump trailers, and more specifically pertains to a mechanism for providing an improved lifting action to the body of a dump trailer.

The principal object of this invention is to provide a mechanism, specifically adapted to large truck trailers of the cable dump type, wherein the wheel base of the trailer and tractor combination is shortened during the vertical tilting movement of the trailer into its dumping position, whereby to secure a greater mechanical advantage during the initial portion of the dumping operation.

A further important object of the invention is to provide a mechanism wherein the operation of the cable rigging which effects the shortening of the wheel base and the dumping operation is also employed to energize an auxiliary lifting mechanism for imparting an additional thrust to the trailer body during the initial portion of the dumping operation of the same.

A further important object of the invention is to provide an apparatus in conformance with the preceding objects whereby to facilitate the breaking of the angle of repose or the dead center position of the lifting mechanism during the initial portion of the lifting operation.

And a final important object to be specifically enumerated herein, resides in the provision of an apparatus in conformity with the preceding objects wherein the upper half of a fifth wheel incorporates therein the improved construction of this invention as interchangeable with other types of fifth wheel assemblies; and to provide a mechanism wherein less power from the tractor motor is required to effect the power operated lifting and dumping operation of the trailer.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a cable dump trailer to which the principles of the present invention have been applied, a portion of the trailer being broken away to show the arrangement of the auxiliary lifting mechanism, the trailer being shown in its lowered or load carrying position;

Figure 2 is a view similar to Figure 1 but showing the trailer in the initial portion of its lifting and dumping operation, and indicating in particular the manner in which the auxiliary lifting mechanism of this invention is effective to provide a mechanical advantage breaking the dead center position of the lifting arrangement;

Figure 5 is a top plan view of the upper fifth wheel assembly plate showing thereon the lower ends of the main trailer lift arms and the auxiliary lift arm together with the cable sheave assembly, the arms being shown in their lowered or load carrying position;

Figure 6 is a diagrammatic view of the cable rigging by which the sheave assembly of the upper fifth wheel plate is connected with a sheave assembly upon the trailer body;

Figure 7 is a view similar to Figure 4 but showing a modified construction, the auxiliary lift arm and the trailer body being shown in full lines in the lowered position and in dotted lines in the auxiliary lifting position;

Figures 8 and 9 are perspective views of the cam or abutment elements of the trailer body cooperating with the auxiliary lift mechanism and of the embodiments of Figures 7 and 4, respectively;

Figure 3:
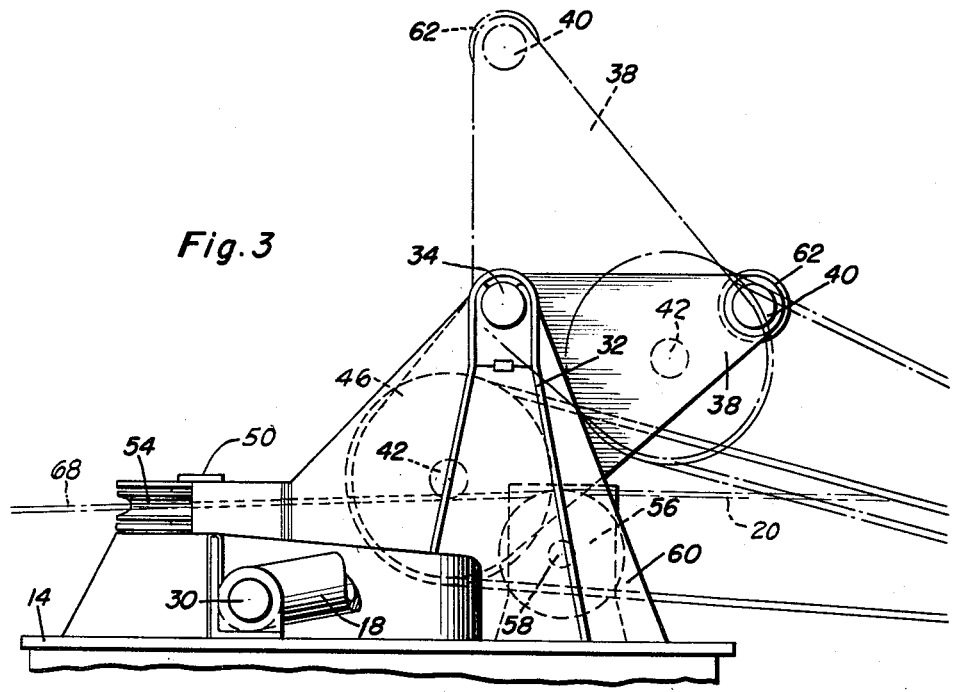
Figure 3 is an enlarged detailed view in side elevation showing the upper fifth wheel element with the cable actuating means of the lift mechanism and the auxiliary lifting unit in accordance with this invention applied thereto, the auxiliary lift arm being shown in full lines in its lowered or idle position, and in dot and dash lines in its elevated or actuated position.

In the accompanying drawings there is indicated a rear portion of any conventional form of tractor vehicle designated generally by the numeral 10 and which is adapted to be operatively associated with a trailer indicated generally by the numeral 12 to constitute a tractor-trailer combination. The tractor is provided with a fifth wheel assembly, the upper plate of which is indicated by the numeral 14, and has mounted thereon certain elements whereby power may be applied from the motor of the tractor, in any conventional manner, the motor not being shown, for causing vertical tilting movement of the trailer from its horizontal position, shown in Figure 1, which is the normal load carrying position of the trailer, to a steeply inclined vertically tilted position, not shown, which is the dumping position of the trailer.

This type of tractor-trailer combination in which the trailer is moved by power means from a horizontal load carrying position to an inclined tilted dumping position, constitutes similar subject matter to that set forth in my prior Patents Nos. 2,637,593, 2,769,662 and 2,661,-236; and in my prior copending applications, Serial Nos. 411,893 and 476,125.

In Figures 1 and 2 of these drawings, the trailer is shown as being provided with a tandem rear axle assembly 16 which is preferably of either of the types disclosed and claimed in my prior Patent No. 2,661,236 and my prior copending application Serial No. 476,125.

In the type of dump trailer to which the present invention is particularly applicable and in connection with which the present invention has been illustrated, a pair of lift arms 18 which constitute compression members are pivotally connected at their outer ends to the trailer body as at 20 and at their inner ends to the fifth wheel assembly of the tractor as at 22. When the wheel base of the tractor-trailer combination is shortened, as by causing the tandem rear axles of the trailer to be drawn toward the chassis of the tractor, or the distance between the pulleys on the trailer and those on the tractor to be shortened, as set forth hereinafter, there will be effected an upward tilting and pivoting movement of the lift arms 18, as will be seen by comparing Figures 1 and 2, which will lift the forward end of the trailer and will incline the trailer eventually to a steeply angled dumping position. During this operation the trailer body pivots about a transverse trunnion 24, carried by the tandem axle assembly, as set forth in detail and as claimed in my prior Patent No. 2,661,236. In order to effect this tilting movement there is provided a cable rigging which is indicated generally by the numeral 26 and which is reeved through a series of pulley sheaves or actuated pulleys 28 carried by the trailer body and its tandem axle assembly; and also through a sheave assembly forming a part of an auxiliary lift mechanism to be later set forth, and eventually being connected to a power operating means, not shown, but which is operated by the motor of the tractor and is adapted to apply a tensioning force to the cable for causing the above mentioned shortening of the wheel base or decreasing of the distance between the two sets of pulleys upon the trailer and the fifth wheel, the tilting of the lift arms 18 and the tilting of the trailer.

The auxiliary lift means which forms a basic feature of the present invention functions to impart the initial tilting movement to the trailer, as in moving the same from its horizontal load carrying position of Figure 1 to a slightly tilted position of Figure 2. This means is so connected with the cable assembly that the initial tensioning movement of the cable is effective first to cause this additional tilting movement from the position of Figure 1 to Figure 2; and thereafter further tensioning of the cable is effected to shorten the wheel base, elevate the lift arm and tilt the trailer to its inclined dumping position. The auxiliary lift means thus primarily serves to provide additional leverage or a mechanical advantage for breaking the substantially straight line or nearly on-center position of the lift arms with respect to the trailer and thus enable the lifting to be effected at its initial stage with much less tension upon the cable and a much smaller requirement for power from the power plant. This feature is important when it is considered that vehicles of this type are frequently adapted to carry loads up to 100 tons.

Figure 4:
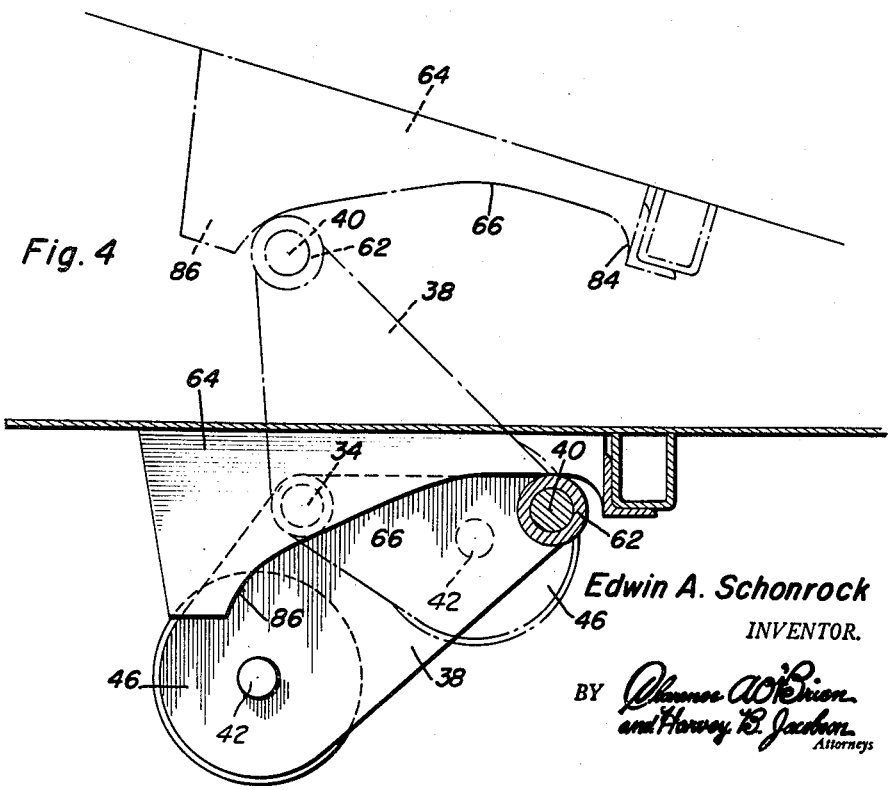
Figure 4 is a vertical longitudinal sectional detailed view of a portion of the trailer body, showing in full lines the position of the body, the auxiliary lift mechanism and the cam or abutment member cooperating therewith, in the lowered position of the trailer; and in dotted lines showing the same in the elevated position of the mechanism.

At this point reference is made more particularly to Figures 3-9 for a better understanding of the construction and functioning of the auxiliary lift means. In the arrangement of Figures 3-5, the upper fifth wheel assembly plate 14 is shown as having a suitable transversely disposed pivot or aligned pivots 30 upon which the forward or lower ends of the lift arms 18 are journaled or pivoted for vertical pivoting movement, the member or members 30 comprising the pivots referred to generally by the numeral 22 hereinbefore.

Also carried by the upper fifth wheel plate 14 are a pair of supports 32 of any suitable character and which supports are provided with fulcrum shafts 34 upon which a lever indicated generally by the numeral 36 and referred to hereinafter as the auxiliary lift lever is journaled for vertical rotation about a horizontal axis.

The lever itself consists of a U-shaped frame which comprises a pair of lever arms 38, each arm conveniently consisting of a pair of spaced parallel plates or members, the arms in turn being joined across one extremity as by a cross bar 40. As will now be apparent from a consideration of Figures 3 and 5, each of the arms consists of plates which are substantially triangular in shape and in effect the arms function as bell cranks. At the other end of the arms from the cross bar 40 and between the pair of parallel plates forming each of the lever arms, there is journaled, as upon axles 42, a pair of pulley sheaves or actuating pulleys 44 and 46. It will be apparent from Figure 3 that the cross bar 40, the pulley axles 42 and the lever arm fulcrums 34 are disposed in a triangular arrangement with the fulcrum between the cross bar and the pulley sheaves, to provide the aforesaid bell crank arrangement.

Likewise mounted upon vertical axles 48 and 50 upon the upper fifth wheel assembly plate 14 are a pair of guide pulleys 52 and 54. Also mounted upon the upper fifth wheel assembly plate 14, see Figure 5, is a vertically disposed guide pulley 56 carried by a horizontal axle 58 mounted in a support 60.

Journaled upon an intermediate portion of the cross arm 40 and adapted to operatively engage the bottom surface of the trailer body, for elevating the same, is a lifting portion consisting of a roller 62.

Cooperating with this roller is a cam surface or track shown particularly in Figure 9, and consisting preferably of a block 64 secured in any desired manner to the undersurface and at the central portion of the bottom of the trailer. This block has upon its bottom surface a suitably curving and contoured cam surface 66 upon which the roller 62 is adapted to ride. The arrangement is such that as the lever is pivoted in a counter-clockwise direction, as viewed in Figures 1-4, about its fulcrum 34, the roller will travel from the right end or vertically elevated portion of the cam surface 66 toward the left end or vertically depressed portion of the cam surface, thus producing a camming action and causing the upward tilting of the trailer body. As will be readily understood, the cam surface will be given any desired contour in order to obtain the maximum leverage or mechanical advantage in causing the initial lifting movement of the trailer body in the first portion of its dumping motion.

In order to better understand how the operation of the auxiliary lifting means is effected, and the manner in which the same cooperates with and forms a part of the over-all lifting operation of the lift arms in the dumping movement of the trailer, attention is now directed more specifically to the diagrammatic view of Figure 6. As will be apparent in this view, the cable assembly indicated hereinbefore generally by the numeral 26, has one end portion as at 68 connected with a winch driven from the power take-off of the tractor, not shown. This cable is reeved through the guide pulley 56 previously mentioned, and from thence over one of the end sheaves 28 journaled upon the trailer and its tandem axle assembly. The portion of the cable extending between the pulleys 56 and 28 is provided with the reference numeral 70. This portion of the cable passing over the sheave 28 has its adjacent portion 72 then passed under and about the pulley 44 upon the auxiliary lift arm assembly, and then has its next adjacent portions 74 reeved over the second of the sheaves 28, the next portion 76 of the cable then being engaged, over the sheave 46 of the auxiliary lift arm, and continuing in a portion 78 which is passed over the last of the sheaves 28. The other end portion 80 of the cable is secured to an anchoring lug as at 82 which is mounted upon the fifth wheel assembly, as shown in Figure 5.

It will now be apparent from a comparison of the diagram of Figure 6 with Figure 2 and the showing of Figures 3 and 4 that upon the application of initial tension to the cable end 68, the tensioning of the cable assembly will be effective first to rock the auxiliary lift arms 38 of the auxilary lift means in a counter-clockwise direction about its fulcrum 34. This rocking movement will, of course, cause the cam follower roller 62 to move along the cam surface 66, from the rearward position shown in Figure 1 to the forward or tilting position shown in Figures 2 and 4. It will be observed that the cam track has downwardly turned portions 84 and 86 at its opposite ends which thereby prevent the possibility of the roller 62 from running off of the ends of the cam track. After the tensioning of the cable has moved the lift lever of the auxiliary lift means to its extreme counter-clockwise position shown in Figure 4, it will be observed that the pivots or axles 34 of the sheaves 44 and 46 have been moved into a substantially horizontal but direct alignment with the fulcrum 34 and with the axes of the actuated pulleys or sheaves 28, whereby further counter-clockwise movement of the lift arm is now impossible. Accordingly, further tensioning force applied to the cable assembly will now cause the actuated pulleys or sheaves 28 to move toward the actuating pulleys 44 and 46 thereby decreasing the distance therebetween and shortening the wheel base of the assembly and causing the rear tandem axle assembly of the trailer to move toward the rear axle of the tractor. During this forward movement, the lift arms or compression members 18 are then moved or pivoted about their axes 30 from their slightly inclined position of Figure 2, which they assumed at the completion of the action of the auxiliary lift means, into a sharply inclined position, not shown, and which constitutes the dumping position of the trailer.

A slightly modified form of the same principles of this invention is illustrated in Figures 7 and 8. The same elements are employed as in the preceding embodiment and the operation is identical as to the sequence of actions and the general principles involved. However, in this form, it will be observed that the triangular shaped auxiliary lift arms 88, and which correspond to the lift arms 38, are connected at one end to the fulcrum 90 carried by support 92, while the pivots 94 of the sheave pulleys 96, the latter corresponding to the sheave pulleys 44 and 46, are positioned above the fulcrum 90.

Also, the cross arm 98 of the lift arm assembly, and its lifting portion or roller 100, are disposed vertically above but to one side of both the fulcrum 90 and the axles 94. Further, the body 102 having the cam surface 104 is substantially reversed with respect to the member 64, but is secured to the bottom of the trailer body in exactly the same manner as the member 64.

In this form of the invention, upon the initial tensioning of the cable assembly, the lever arm 88 of the auxiliary lift means is rotated in a clockwise direction about the fulcrum 90 and the member 100 moves toward the right upon the cam track 104, thus lifting the trailer body from its horizontal full line position to its partially tilted dotted line position, as shown in Figure 7. At the same time, the lever line pulleys and their equivalents 96 and 94 move from the full line position, shown in Figure 7, to a slightly downward and forward dotted line position, shown therein. When this position is reached, continued tensioning of the cable means causes the actuation of the lift arms as previously set forth.

The embodiment of Figure 7 thus functions the same as Figure 4, but effects a slightly lowered arrangement of the lever arm assembly of the auxiliary lift means.

It is obvious that the arrangements shown will greatly improve the mechanical efficiency of the actuating means for the trailer tilting and dumping mechanism by reducing the initial strain or force required to initiate the tilting movement of the loaded trailer body, and this will require relatively slight changes in the lifting and dumping mechanism. In addition, all the elements required, except the cam member mounted upon the bottom of the trailer body and the pulley sheave assembly 28 mounted upon the trailer and its tandem axle assembly, are carried by the upper fifth wheel assembly plate 14, thereby permitting easy removal of the same as a sub-assembly from the trailer-tractor unit; and permitting the turning movement of the trailer during the tilting of the same to its dumping position.

The hereinbefore illustrated and described constructions constitute apparatuses which are found to be generally satisfactory in their performance. However, and especially for heavy duty performance, it is preferred to include a safety bracket assembly, the details of which have been illustrated in Figures 10–12. Since in some instances this construction may be omitted as unnecessary, it has been deemed unnecessary to include the same in the showing of Figures 1–9.

In order to provide additional support for the upper plate of the fifth wheel assembly, to assist in maintaining the same in a plane parallel to that of the lower fifth wheel plate against the thrust of the auxiliary lift lever, a guiding bracket safety assembly is employed.

Figure 10:
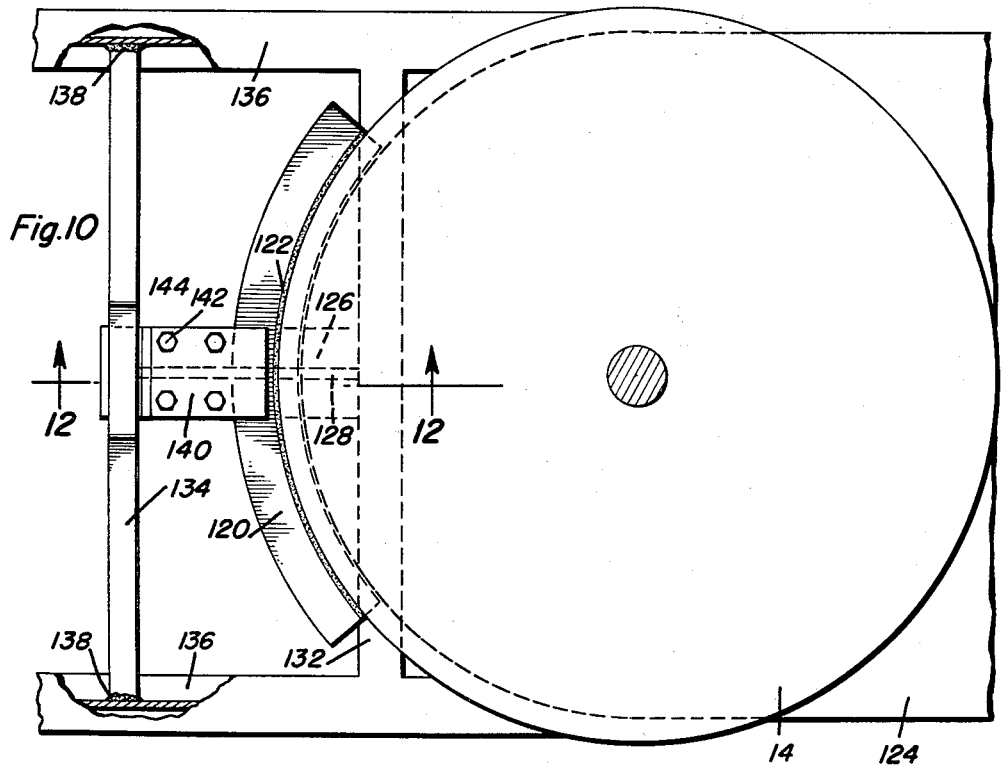
Figure 10 is a fragmentary top plan view showing a safety or fifth wheel reinforcing bracket assembly which may be used with the construction of Figures 1–9.
Figure 11:
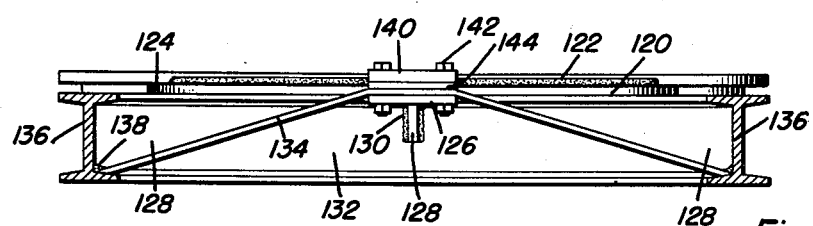
Figure 11 is a detail view showing in vertical transverse section, further details of the bracket assembly of Figure 10.
Figure 12:
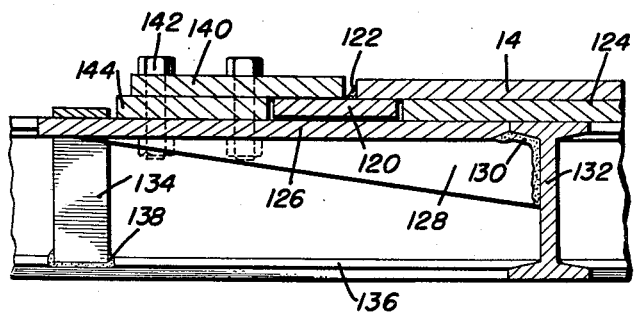
Figure 12 is a detail view, taken upon an enlarged scale substantially upon the plane indicated by the section line 12—12 of Figure 10.

The latter includes a guide flange extension comprising an arcuate plate 120 which extends radially beyond, but preferably concentric with the periphery of the upper fifth wheel plate 14. While the flange may be attached in any desired manner, a very satisfactory manner which is especially suitable in converting conventional fifth wheel assemblies to the purposes of this invention is illustrated in Figures 10–12. The flange is lapped to the underside of the upper plate and is secured as by a welding seam 122. The flange may conveniently be of the same thickness or slightly less than that of the lower plate or base of the fifth wheel assembly, shown at 124, whereby the flange may be compactly positioned by movement within the space customarily available.

Cooperating with the flange extension, which thus swings or oscillates with the upper plate assembly of the fifth wheel, is a stationary guide and retainer assembly, whose construction is such as to adapt the same for easy attachment to conventional tractor frames. The guide and retainer assembly consist of a base 126, which may comprise a plate suitably attached to the tractor frame. A triangular brace plate 128 is secured to and depends from the medial portion of the underside of the base plate and may be integral therewith. Welding 130 may be employed to secure the plates 126 and 128 to a cross member 132 of the tractor frame. A hold-down strap 134 extends across the outer end of the base plate 126 and may be fixedly secured thereto, serving to brace and rigidify the base plate. The strap is shown as attached to the longitudinal frame members 136 of the tractor as by welding seams 138.

A retainer plate 140 is secured as by bolts 142 to the base plate 126, a spacer block or plate 144 being interposed. The end of the retainer plate thus overlies, with a slight working clearance, the flange extension 120, which is free to oscillate horizontally between the retainer 140 and the base plate 126, during pivoting of the upper plate of the fifth wheel, but is guided and restrained against tilting movements, which might be produced by the thrust of the auxiliary lift means on the upper plate.

The safety assembly is compact, easily installed and provides adequate safeguards against tilting of the fifth wheel.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tractor and cable dump trailer assembly comprising a tractor, a trailer, and a fifth wheel assembly connected between said tractor and trailer, said fifth wheel assembly having a lower plate mounted upon said tractor adjacent the rear end thereof and an upper plate pivoted to said lower plate, lift arms comprising compression members and each pivoted at its opposite ends to said upper plate and to said trailer for swinging movement in a vertical plane, an auxiliary lift lever pivoted to said upper plate for swinging movement in a vertical plane, said trailer having a surface attached to the trailer and parallel to the floor of said trailer, said auxiliary lift lever having a portion engaging and movable along and transmitting a lifting thrust to said surface, actuating and actuated pulleys journalled respectively upon said auxiliary lift lever and said trailer, said portion being displaced from the line connecting the axes of said actuating pulley and the pivot of said auxiliary lift lever, a tension member reeved through said actuating and actuated pulleys and upon tensioning thereof causing swinging of said auxiliary lift lever and partial lifting of said trailer and upon further tensioning thereof causing shortening of the distance between said actuating and actuated pulleys whereby to cause swinging of said lift arm and complete the lifting of said trailer.

2. The combination of claim 1 wherein said auxiliary lift lever includes a pair of auxiliary lift arms secured together in fixed side by side relation, a roller disposed between and rotatably journaled upon said auxiliary lift arms and comprising said portion.

3. The combination of claim 1 including a pivot means connecting said auxiliary lift lever intermediate its ends to said upper plate, said portion and said actuating pulleys being disposed on opposite sides of said pivot means.

4. The combination of claim 1 including a pivot means connecting said auxiliary lift lever at one end thereof to said upper plate, said portion being disposed in spaced relation to said pivot means.

5. The combination of claim 1 including a pivot means connecting said auxiliary lift lever to said upper plate, said pivot means, portion and actuating pulleys being in spaced relation upon said auxiliary lift lever, said actuating pulleys being disposed to one side of a line extending from said pivot means to said portion.

6. The combination of claim 1 including a pivot means connecting said auxiliary lift lever to said upper plate, said pivot means, said portion and said actuating pulleys being disposed in spaced relation upon said auxiliary lift lever, said pivot means being disposed between said portion and said pulleys and to one side of a line extending from said portion to said actuating pulleys.

7. The combination of claim 1 including a brace means rigidly connected to the lower plate and having a portion engaging the upper plate and limiting tilting of the upper plate in response to the thrust applied thereto by said lift arms and said auxiliary lift lever.

8. A tractor and dump trailer assembly comprising a tractor, a trailer, and a fifth wheel assembly connected between said tractor and trailer, said fifth wheel assembly having a lower plate mounted upon said tractor adjacent the rear end thereof and an upper plate pivoted to said lower plate, lift arms comprising compression members and each pivoted at its opposite ends to said upper plate and to said trailer for swinging movement in a vertical plane, an auxiliary lift lever pivoted to said upper plate for swinging movement in a vertical plane, said trailer having a surface attached to the trailer and parallel to the floor of said trailer, said auxiliary lift lever having a portion engaging and movable along and transmitting a lifting thrust to said surface, actuating and actuated elements mounted respectively upon said auxiliary lift lever and said trailer, said portion being displaced from the line connecting the axes of said actuating pulley and the pivot of said auxiliary lift lever, a tension member connecting said actuating and actuated elements and upon tensioning thereof causing swinging of said auxiliary lift lever and partial lifting of said trailer and upon further tensioning thereof causing shortening of the distance between said actuating and actuated pulleys whereby to cause swinging of said lift arm and complete the lifting of said trailer.

9. The combination of claim 8 wherein said surface is spaced forwardly of said trailer from the pivoted connection of said lift arms to said trailer.

10. The combination of claim 8 wherein said surface is located at the forward end of said trailer.

11. The combination of claim 8 wherein said surface is located beneath the forward end of said trailer and between the sides of the trailer.

12. The combination of claim 8 wherein said surface has a contour which upon successive portions of its length is disposed at different distances from the bottom of said trailer.

13. The combination of claim 8 including a brace means rigidly connected to the lower plate and having a portion engaging the upper plate and limiting tilting of the upper plate in response to the thrust applied thereto by said lift arms and said auxiliary lift lever.

14. In a tractor and cable dump trailer assembly including a tractor, a trailer, and a fifth wheel assembly connected between said tractor and trailer, said fifth wheel assembly comprising a lower plate mounted on said tractor adjacent the rear end thereof and an upper plate pivoted to said lower plate; the improvement comprising lift arms constituting compression members and each pivoted at one end to said upper plate for rotative movement in a vertical plane, an auxiliary lift lever pivoted to said upper plate for rotative movement in a vertical plane and having a portion engageable with said trailer for lifting said trailer, actuating pulleys journaled on said auxiliary lift lever, said portion being displaced from the line connecting the axes of said actuating pulley and the pivot of said auxiliary lift lever, a tension member reeved through said actuating pulleys for connection to actuated pulleys journaled on said trailer whereby tensioning of said tension member will cause rotational movement of said auxiliary lift lever and further tensioning of said tension member will cause shortening of the length of said tension member between the actuating and the actuated pulleys to thereby effect rotative movement of said lift arms.

15. The combination of claim 14 wherein said auxiliary lift lever comprises a pair of auxiliary lift arms secured together in fixed, spaced, side by side relation, each auxiliary lift arm consisting of a pair of members fixedly secured together in spaced side by side relation, said actuating pulleys being each mounted upon one of said auxiliary lift arms and being rotatably journaled between the pair of members thereof.

16. The combination of claim 15 wherein said portion comprises a roller disposed between and rotatably journaled upon said pair of auxiliary lift arms.

17. The combination of claim 14 including a brace means rigidly connected to the lower plate and having a portion engaging the upper plate and limiting tilting of the upper plate in response to the thrust applied thereto by said lift arms and said auxiliary lift lever.

18. In a tractor and dump trailer assembly including a tractor, a trailer, and a fifth wheel assembly connected between said tractor and trailer, said fifth wheel assembly comprising a lower plate mounted on said tractor adjacent the rear end thereof and an upper plate pivoted to said lower plate; the improvement comprising lift arms constituting compression members and each pivoted at one end to said upper plate for rotative movement in a vertical plane, an auxiliary lift lever pivoted to said upper plate for rotative movement in a vertical plane and having a portion engageable with said trailer for lifting said trailer, actuating elements mounted on said auxiliary lift lever, said portion being displaced from the line connecting the axes of said actuating pulley and the pivot of said auxiliary lift lever, a tension member connected to said actuating elements for connection to actuated elements mounted on said trailer whereby tensioning of said tension member will cause rotational movement of said auxiliary lift lever and further tensioning of said tension member will cause shortening of the length of said tension member between the actuating and the actuated elements to thereby effect rotative movement of said lift arms.

19. The combination of claim 18 wherein the pivotal connection of the lift arms to said upper plate are disposed upon opposite sides of the pivotal connection of the auxiliary lift lever to said upper plate.

20. The combination of claim 18 wherein said auxiliary lift lever includes a pair of auxiliary lift arms secured together in fixed side by side relation, a roller disposed between and rotatably journaled upon said auxiliary lift arms and comprising said portion.

21. The combination of claim 18 including a pivot means connecting said auxiliary lift lever intermediate its ends to said upper plate, said portion and said actuating elements being disposed on opposite sides of said pivot means.

22. The combination of claim 18 including a pivot means connecting said auxiliary lift lever at one end thereof to said upper plate, said portion being disposed in spaced relation to said pivot means.

23. The combination of claim 18 including a pivot means connecting said auxiliary lift lever to said upper plate, said pivot means, portion and actuating element being in spaced relation upon said auxiliary lift lever, said actuating element being disposed to one side of a line extending from said pivot means to said portion.

24. The combination of claim 18 including a pivot means connecting said auxiliary lift lever to said upper plate, said pivot means, said portion and said actuating element being disposed in spaced relation upon said auxiliary lift lever, said pivot means being disposed between said portion and said actuating element to one side of a line extending from said portion to said actuating element.

25. The combination of claim 18 including a brace means rigidly connected to the lower plate and having a portion engaging the upper plate and limiting tilting of the upper plate in response to the thrust applied thereto by said lift arms and said auxiliary lift lever.

References Cited in the file of this patent

UNITED STATES PATENTS

| | | |
|---|---|---|
| 840,854 | Kukielski | Jan. 8, 1907 |
| 1,078,801 | Munsing | Nov. 18, 1913 |
| 1,193,932 | Shadbolt | Aug. 8, 1916 |
| 1,325,517 | Hollnagel | Dec. 23, 1919 |
| 1,943,050 | Beath | Jan. 9, 1934 |
| 2,517,933 | Schonrock | Aug. 8, 1950 |
| 2,542,795 | Clement et al. | Feb. 20, 1951 |
| 2,603,518 | Golay | July 15, 1952 |
| 2,635,919 | Watson | Apr. 21, 1953 |
| 2,667,364 | Colopo | Jan. 26, 1954 |